US008850726B2

(12) United States Patent
Dennis et al.

(10) Patent No.: US 8,850,726 B2
(45) Date of Patent: Oct. 7, 2014

(54) MOTION GREETING CARDS

(71) Applicant: American Greetings Corporation, Cleveland, OH (US)

(72) Inventors: Erin Dennis, Lakewood, OH (US); Lynne Shlonsky, Shaker Heights, OH (US); John Talbot, Bay Village, OH (US); David Mayer, Bay Village, OH (US)

(73) Assignee: American Greetings Corporation, Cleveland, OH (US)

(*) Notice: Subject to any disclaimer, the term of this patent is extended or adjusted under 35 U.S.C. 154(b) by 0 days.

(21) Appl. No.: 13/800,283

(22) Filed: Mar. 13, 2013

(65) Prior Publication Data
US 2013/0192103 A1 Aug. 1, 2013

Related U.S. Application Data

(63) Continuation-in-part of application No. 13/447,703, filed on Apr. 16, 2012, now Pat. No. 8,574,505, which
(Continued)

(51) Int. Cl.
G09F 1/00 (2006.01)
G09F 1/04 (2006.01)
B42D 15/00 (2006.01)
B42D 15/02 (2006.01)
B42D 15/04 (2006.01)
C01B 33/107 (2006.01)
G09F 1/08 (2006.01)

(52) U.S. Cl.
CPC .............. G09F 1/04 (2013.01); B42D 15/0093 (2013.01); B42D 15/022 (2013.01); B42D 15/042 (2013.01); G09F 1/08 (2013.01); C01B 33/10778 (2013.01)

USPC ........................................ 40/124.03

(58) Field of Classification Search
CPC ......... B42D 15/022; G09F 1/00; G09F 19/08; G09F 25/00
USPC ........................................ 40/124.03
See application file for complete search history.

(56) References Cited

U.S. PATENT DOCUMENTS 2,927,400 A 3/1960 Bailey
4,592,573 A * 6/1986 Crowell .......................... 283/56
(Continued)

FOREIGN PATENT DOCUMENTS

NL 0133961 12/2007

OTHER PUBLICATIONS

"Motor/Sound Module for Greeting Card", retrieved on Oct. 17, 2001 from http://www.alibaba.com/product-gs/358784246/Motor_Sound_Module_for_Greeting_Card.html.

Primary Examiner — Charles A Fox
Assistant Examiner — Shin Kim
(74) Attorney, Agent, or Firm — Christine Flanagan

(57) ABSTRACT

The present invention and related disclosure describes greeting cards with moving elements or devices which are operable to create motion in connection with some portion of the greeting card. The greeting card may include a multi-panel greeting card body or a three-dimensional foam greeting card body. At least one movable object is contained upon or within the greeting card body. A sound module having at least one pre-recorded digital audio file saved therein and a motor module are contained and concealed within the greeting card body. One or more switches may be used to activate the sound and motor modules, causing the pre-recorded audio file to play and causing movement of the movable or mobile object. This movement may be up-and-down or "bouncing" motion, spinning or rotational motion, side-to-side motion or any other reciprocating motion.

20 Claims, 9 Drawing Sheets

Related U.S. Application Data is a continuation-in-part of application No. 12/940,145, filed on Nov. 5, 2010, now Pat. No. 8,230,624, application No. 13/800,283, filed on Mar. 13, 2013, which is a continuation-in-part of application No. 13/459,553, filed on Apr. 30, 2012, now abandoned, which is a continuation-in-part of application No. 13/004,544, filed on Jan. 11, 2011, now Pat. No. 8,205,365.

(56) References Cited

U.S. PATENT DOCUMENTS

| | | | |
|---|---|---|---|
| 5,022,681 A * | 6/1991 | Penick | 281/15.1 |
| 5,025,580 A | 6/1991 | Asai | |
| 5,063,698 A | 11/1991 | Johnson et al. | |
| 5,257,823 A * | 11/1993 | Colvin et al. | 283/117 |
| 5,743,035 A | 4/1998 | Bradley et al. | |
| 6,357,152 B1 | 3/2002 | Brooks et al. | |
| 6,460,277 B1 | 10/2002 | Tower | |
| 6,845,583 B2 * | 1/2005 | Lee | 40/717 |
| 6,848,965 B2 | 2/2005 | Wong | |
| 7,201,402 B2 | 4/2007 | Duprey | |
| 7,634,864 B2 | 12/2009 | Segan | |
| 8,205,365 B2 * | 6/2012 | Taylor et al. | 40/124.03 |
| 8,230,624 B2 | 7/2012 | Sapp et al. | |
| 8,256,150 B2 | 9/2012 | Qiao et al. | |
| 8,490,306 B2 * | 7/2013 | Guo et al. | 40/124.08 |
| 8,584,385 B2 * | 11/2013 | Mayer et al. | 40/124.03 |
| 2004/0237359 A1 | 12/2004 | Lee | |
| 2008/0032587 A1 | 2/2008 | Krivanek et al. | |
| 2009/0126239 A1 | 5/2009 | Clegg | |
| 2009/0241387 A1 | 10/2009 | Wong | |
| 2012/0192467 A1 | 8/2012 | Qiao et al. | |
| 2012/0266503 A1 | 10/2012 | Sapp et al. | |
| 2012/0304510 A1 | 12/2012 | Qiao et al. | |

\* cited by examiner

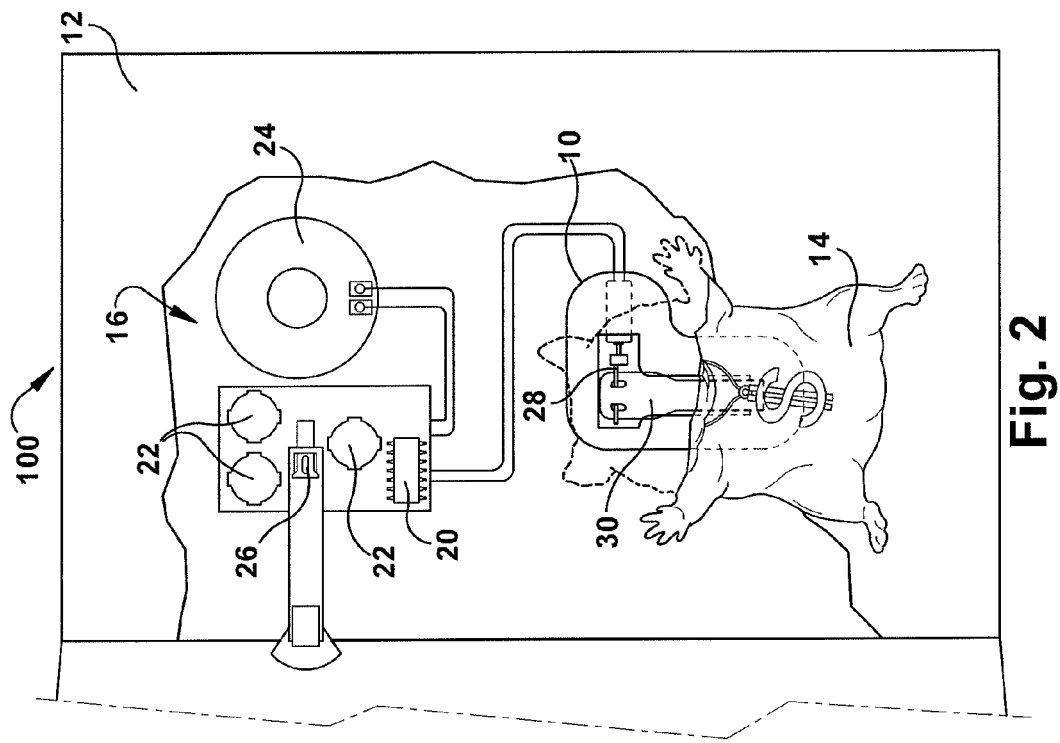
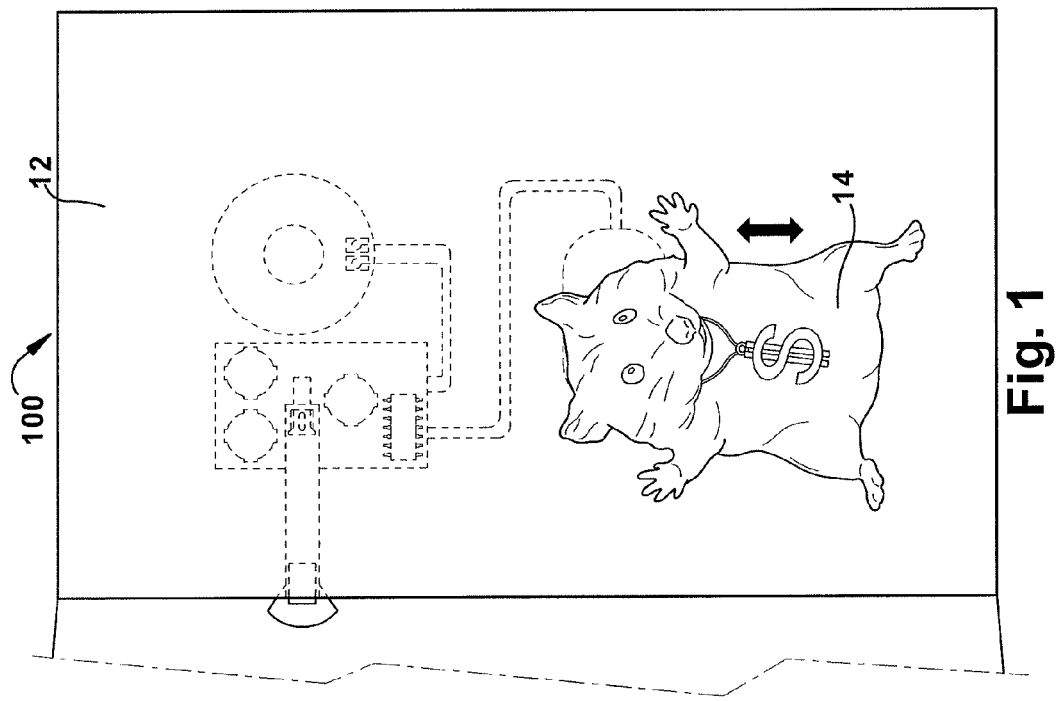

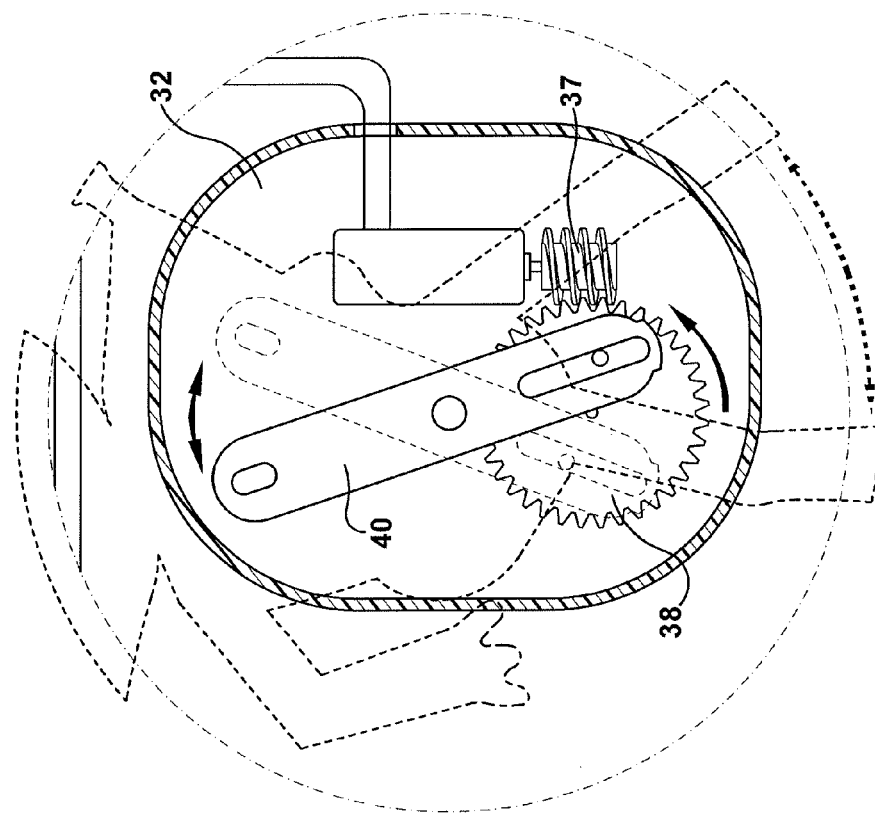
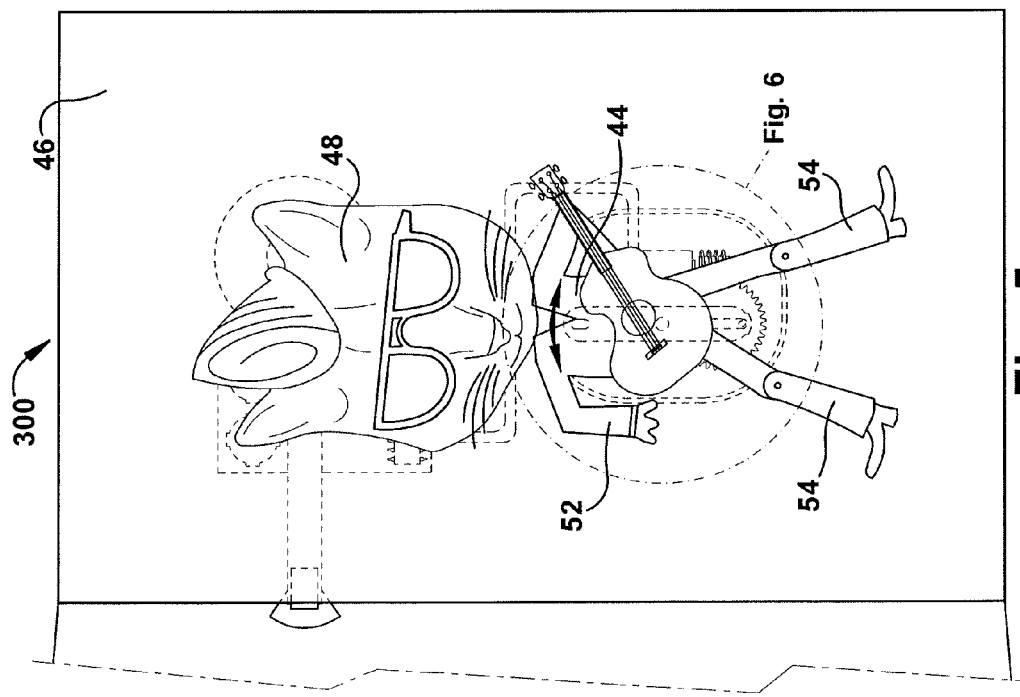

MOTION GREETING CARDS

RELATED APPLICATIONS

This application is a continuation-in-part of and claims priority to U.S. patent application Ser. No. 13/447,403, filed on Apr. 16, 2012, which is a continuation-in-part of U.S. application Ser. No. 12/940,145, filed on Nov. 5, 2010. This application also claims priority to U.S. patent application Ser. No. 13/459,553, filed on Apr. 30, 2012, which claims priority to U.S. patent application Ser. No. 13/004,544, filed on Jan. 11, 2011. The aforementioned United States patent applications are incorporated by reference herein in their entirety.

FIELD OF THE INVENTION

The present invention relates to greeting cards and more specifically, to greeting cards having one or more moving elements and functions which create motion.

BACKGROUND OF THE INVENTION

For many years paper greeting cards containing text sentiment and associated artwork have been widely used for celebratory occasions such as birthdays, graduations, weddings, and for other commercial purposes. More recently, greeting cards have been enhanced by incorporating sound and other effects. Sound generating devices have been incorporated into traditional paper greeting cards to increase entertainment value and emotional impact. In some forms, a talking or musical greeting card looks just like a conventional greeting card, except that it includes a hidden sound module with a pre-recorded sound track. Opening the greeting card will automatically turn on or close a switch so that the sound module will play the pre-stored music or dialog and closing the greeting card will automatically open the switch and stop the play of the music or dialog.

There is a need in the art for a greeting card that increases the entertainment value and raises the surprise factor of traditional or sound generating greeting cards that may still be mailed to a recipient and is relatively similar in size and thickness to a traditional paper greeting.

SUMMARY OF THE INVENTION

A first embodiment of the present invention and related disclosure includes a multi-panel greeting card body, a sound module concealed between two panels of the greeting card body, a motor module concealed between two panels of the greeting card body, a mobile object attached to the motor module, a power supply, at least one pre-recorded digital audio file saved within the sound module, and a switch which activates the sound module and the motor module upon opening of the greeting card, activation of the motor module causing movement of the mobile object and activation of the sound module causing the at least one pre-recorded digital audio file to play.

Another embodiment includes a multi-panel greeting card body, a sound module, a motor module, a mobile object comprising two or more die cut pieces that are connected to each other at a connection point such that the two or more die cut pieces are pivotable about the connection point, the mobile object being attached to a connecting rod, the connecting rod being attached to the motor module and the connecting rod being concealed between the greeting card body and the mobile object, at least one die cut piece having a front surface and a back surface, the at least one die cut piece being located proximate to the mobile object, a spring mechanism that is attached at one end to the greeting card body and attached at the other end to the at least one die cut piece, a switch to activate the sound module and the motor module wherein when the sound module is activated, a pre-recorded audio clip is played and when the motor module is activated, the connecting rod and mobile object are set in motion.

Still another embodiment includes a three-dimensional foam greeting card body, a first planar surface attached to a front surface of the three-dimensional foam greeting card body, a second planar surface attached to a back surface of the three-dimensional foam greeting card body, a movable object attached to the first planar surface and connected to a motor module through an opening in the three-dimensional foam greeting card body and the first planar surface, a sound module encased and concealed within the three-dimensional foam greeting card body, a motor module encased and concealed within the three-dimensional foam greeting card body, a power source, and a push button switch, wherein when the push button switch is pressed, the sound module is activated causing a pre-recorded digital audio file to play, and the motor module is activated causing the mobile object to move or vibrate in an up-and-down motion.

Yet another embodiment of the motion greeting cards of the present invention includes a multi-panel greeting card, a sound module, a motor module having a rotating gear mechanism that when activated turns a circular gear, a mobile object attached to the circular gear of the motor module, a power supply, at least one pre-recorded digital audio file saved within the sound module, and a switch which activates the sound and motor modules module causing the at least one pre-recorded digital audio file to play and causing circular or rotational movement of the mobile object.

DESCRIPTION OF THE DRAWINGS

FIG. 1 is a front view of an inside panel of a first embodiment of the motion greeting cards of the present invention.

FIG. 2 is a cutaway view of the motion greeting card of FIG. 1.

FIG. 5 is a front view of an inside panel of a third embodiment of the motion greeting cards of the present invention.

FIG. 6 is a front view of the motor module of the motion greeting card of FIG. 5.

DETAILED DESCRIPTION OF PREFERRED AND ALTERNATE EMBODIMENTS

The motion greeting cards of the present invention and related disclosure combine movement with sound and a photograph, illustration or digital art to create a new and novel category of greeting card. Each embodiment features a mobile object that is powered by a small motor and which simulates motions including, but not limited to, dancing, bouncing, hopping, shaking and spinning. Audio including music, voice and/or sound effect may accompany the motion and may be triggered before, after, or simultaneously with the motion effect. The mechanized movement may be synchronized with the audio.

Figure 11:
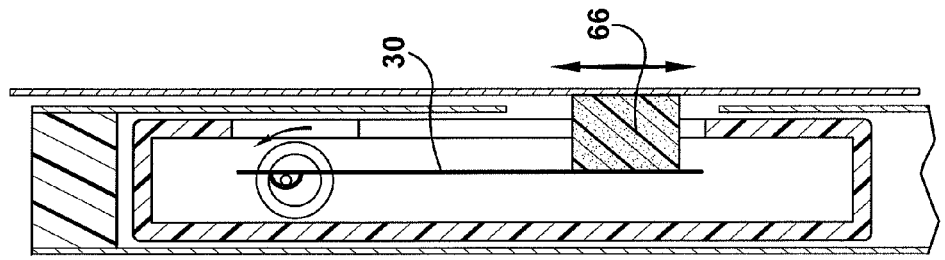
FIG. 11 is a cross-section view of the motor of FIG. 10.
Figure 10:
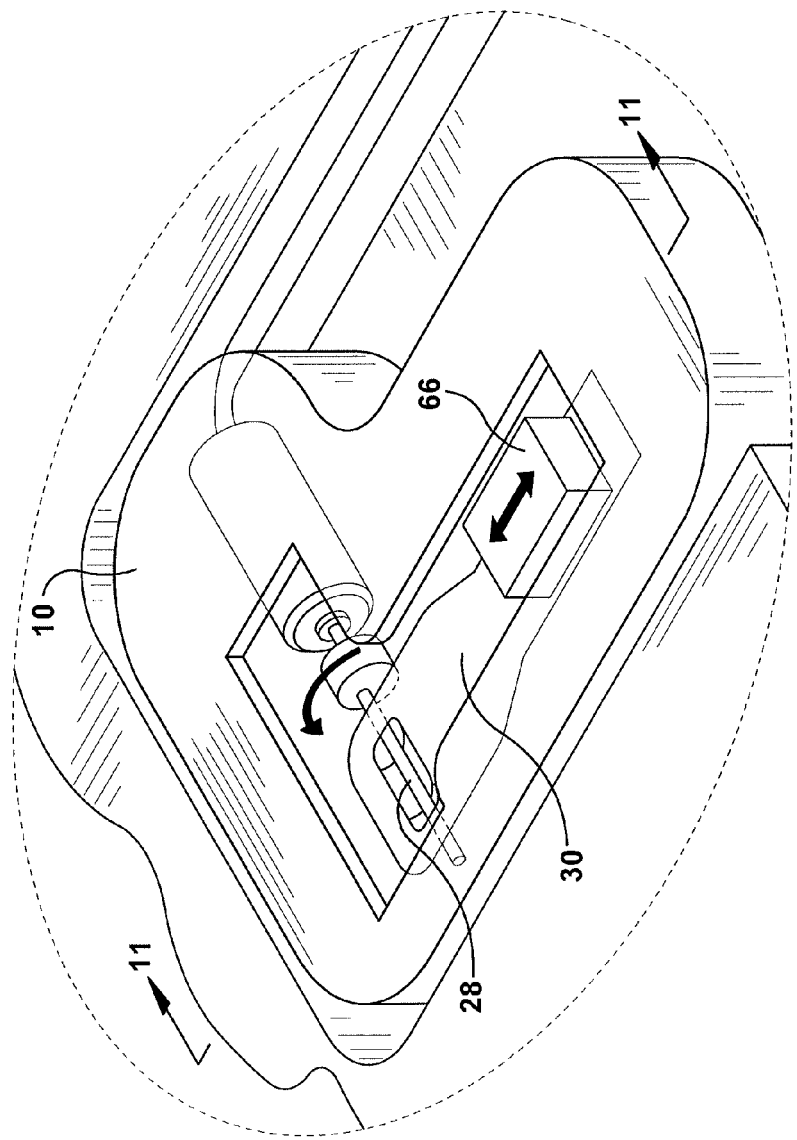
FIG. 10 is a perspective view of the motor of the motion greeting card of FIG. 1 and FIG. 8.
Figure 12:
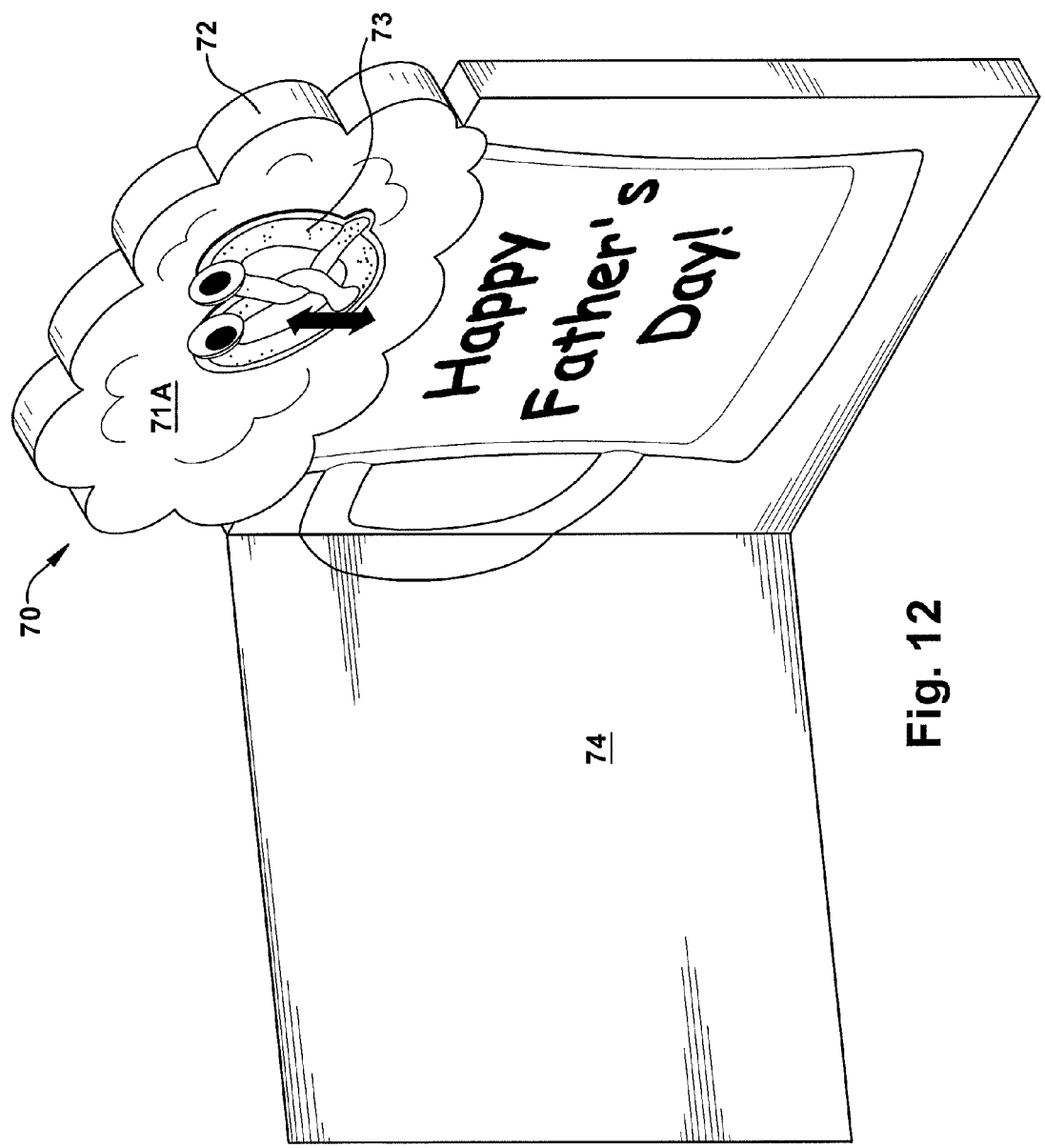
FIG. 12 is a perspective view of fifth embodiment of the motion greeting card of the present invention, in an open position.
Figure 13:
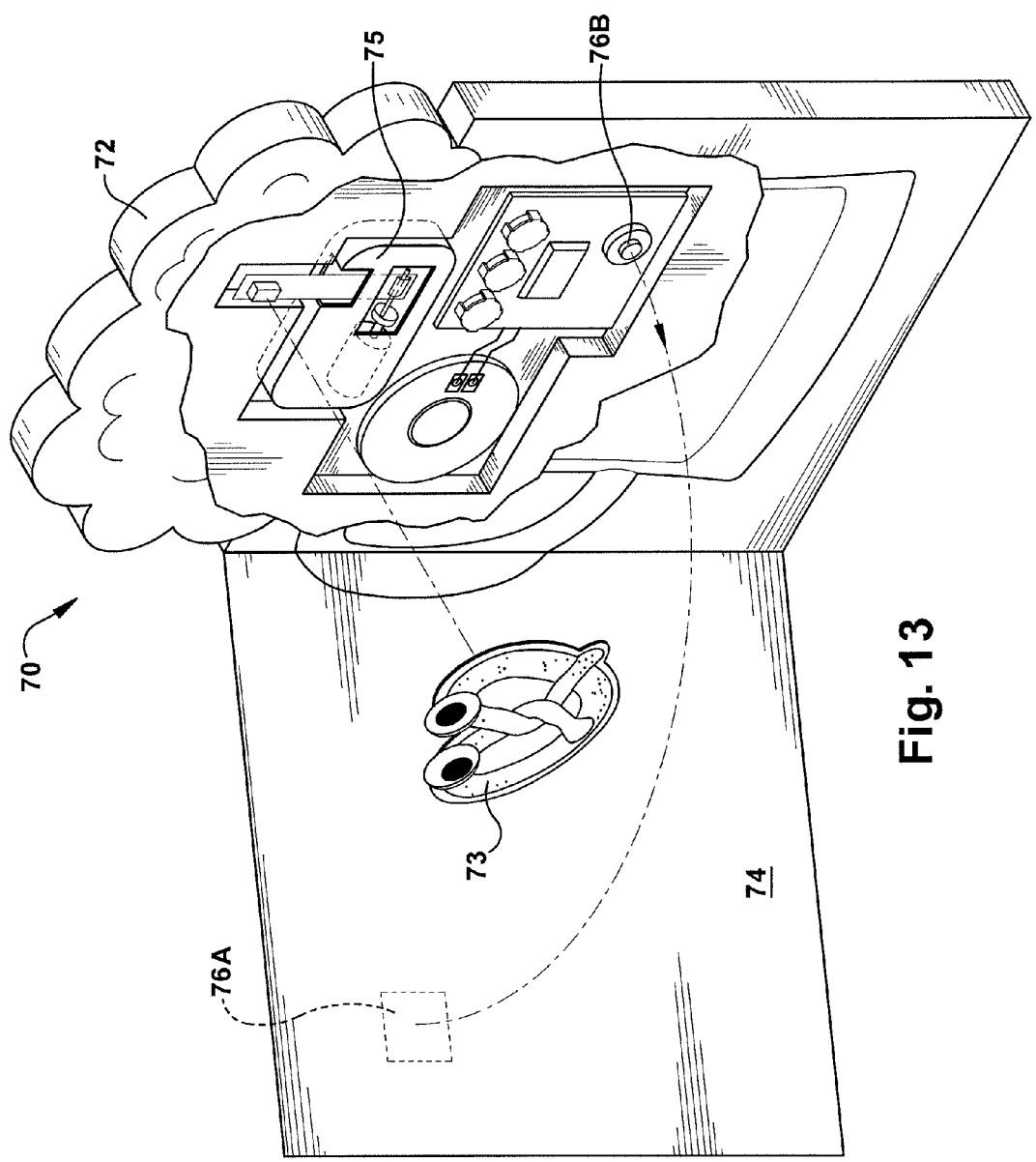
FIG. 13 is a tear away view of the motion greeting card of FIG. 12.
Figure 14:
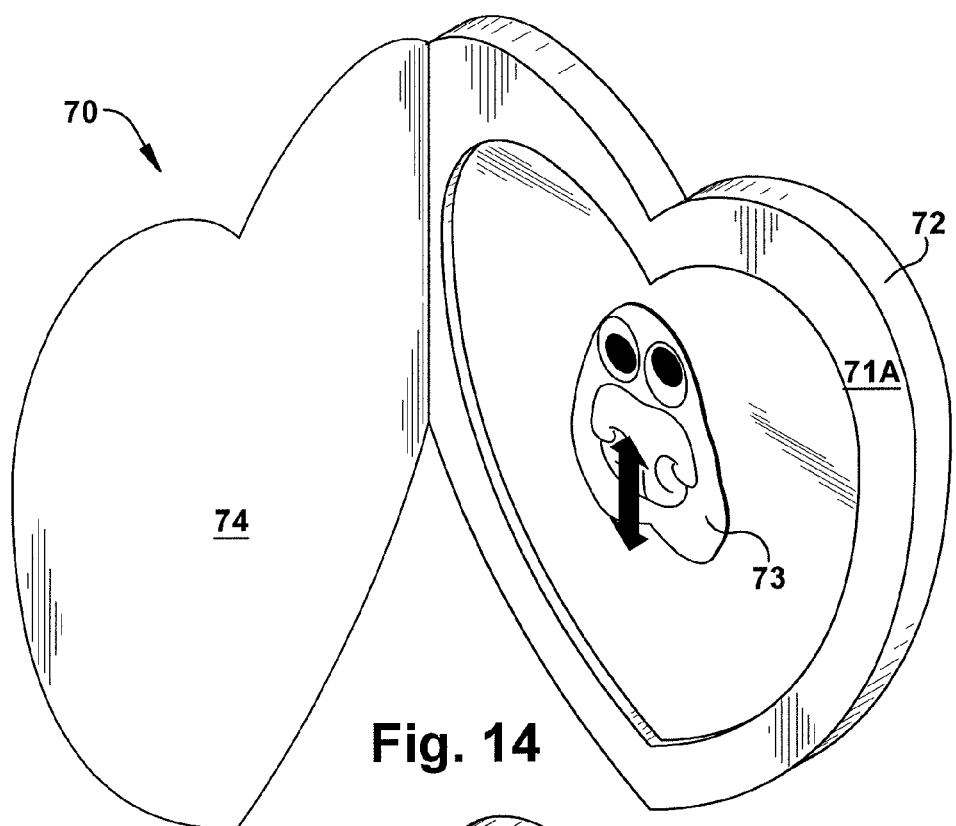
FIG. 14 is a perspective view of an alternate embodiment of the motion greeting card of claim 12, in an open position.
Figure 15:
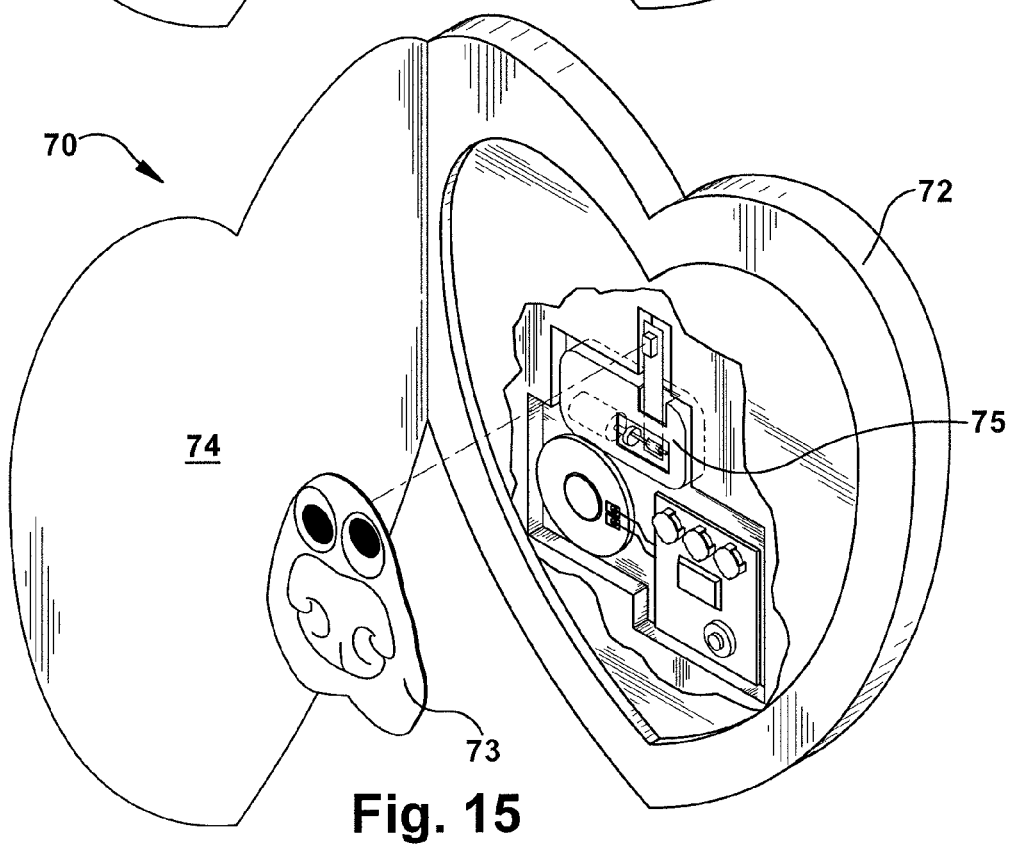
FIG. 15 is a tear away view of the motion greeting card of FIG. 14.

A first embodiment of the motion greeting cards 100 of the present invention contains at least one motor module 10 which causes the movement or "bouncing" of at least one mobile object 14 associated with a greeting card body 12. As used herein, the term "bouncing" is used to describe up and down motion, side to side motion or any other reciprocating motion. In a preferred embodiment, the greeting card body 12 contains three greeting card panels. A first panel that is connected to a second panel along a first fold line and a third panel connected to the second panel along a second fold line. The first panel serves as the front cover of the greeting card. The third greeting card panel is folded along the second fold line such that it overlies the second panel and creates an internal cavity wherein the greeting card electronics can be concealed. The electronic components, including a sound module 16 and a motor module 10, are attached to the second panel and the second and third panels are attached, adhesively or otherwise, along at least one edge of the second and third panels. A small opening or aperture may exist on the third panel so that the motor component 10 can be connected to the moving or "bouncing" object 14 attached thereto, as shown in FIGS. 1 and 2. The sound module 16 may contain any and all components necessary to store and produce or emit sound. The motor module 10 may contain any and all components necessary to create movement of the mobile object. Some of the internal electronic components may include, but are not limited to: at least one circuit board 18; at least one integrated circuit chip 20; at least one power source 22; at least one speaker 24; at least one motor 10, at least one switch 26 and at least one pre-recorded digital audio clip. The electronic components of the greeting cards described herein are considered to be readily understood and appreciated by one of ordinary skill in the art and are therefore not discussed in detail herein. The motor 10 may be of the type shown in FIG. 2 FIG. 10 and FIG. 11, having a rotating arm 28 or shaft, which may be an offset shaft which creates oscillatory motion upon rotation of the shaft by the motor. A lightweight movement mechanism 30 is attached at one end to the rotating arm 28 of the motor 10 and at an opposite end to the greeting cards mobile object 14 via an attachment mechanism 66. In a preferred embodiment, the mobile object 14 is die cut shape of a person, animated character, animal or any other object having a substantially planar front and back surface so that it will fit within the panels of the greeting card 100 without substantially increasing the thickness of the greeting card 100. The mobile object 14 must be connected to the movement mechanism 30 which is in turn connected to the rotating arm 28 of the motor 10 so that when the motor 10 is activated, the mobile object 14 moves or "bounces". The motor 10 may be activated upon the user opening the greeting card 100. A slide switch 26 may be located across the first fold line between the first and second greeting card panels such that when the greeting card is opened, the electronic components are activated. The slide switch 26 may activate both the pre-recorded sound clip and the motor 10 so that when the greeting card 100 is opened, the pre-recorded sound clip will play along with the movement of the mobile object 14 contained within the greeting card 100. The sound clip, mobile object 14 and greeting card artwork may all be coordinated with a particular theme or occasion. The movements of the mobile object 14 may be synchronized with the audio clip such as, for example, by operation of the motor 10 while the sound module 16 is turned on, or by motion of the mobile object 14 in synch with a song, music or sound clip played by the sound module 16. Alternatively, the greeting card 100 may contain separate switches such that the sound and motion are not activated simultaneously. For example, the sound may be triggered by a slide switch 26 upon opening the greeting card 100. Once the greeting card 100 is opened, a push button or other switch mechanism may be used to activate the motion. In an alternate embodiment, where the mobile object 14 is located on the outside of the greeting card 100, such as on the front face of the card, the motion and/or sound may be triggered by a push button mechanism also located on the front face of the greeting card 100.

Figure 4:
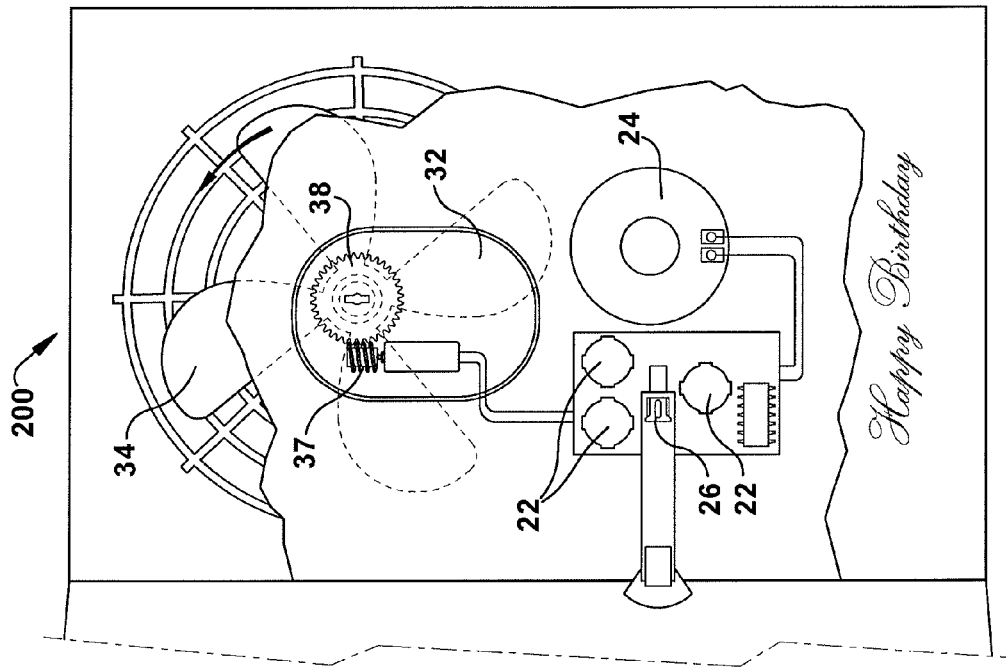
FIG. 4 is a cutaway view of the motion greeting card of FIG. 3.
Figure 3:
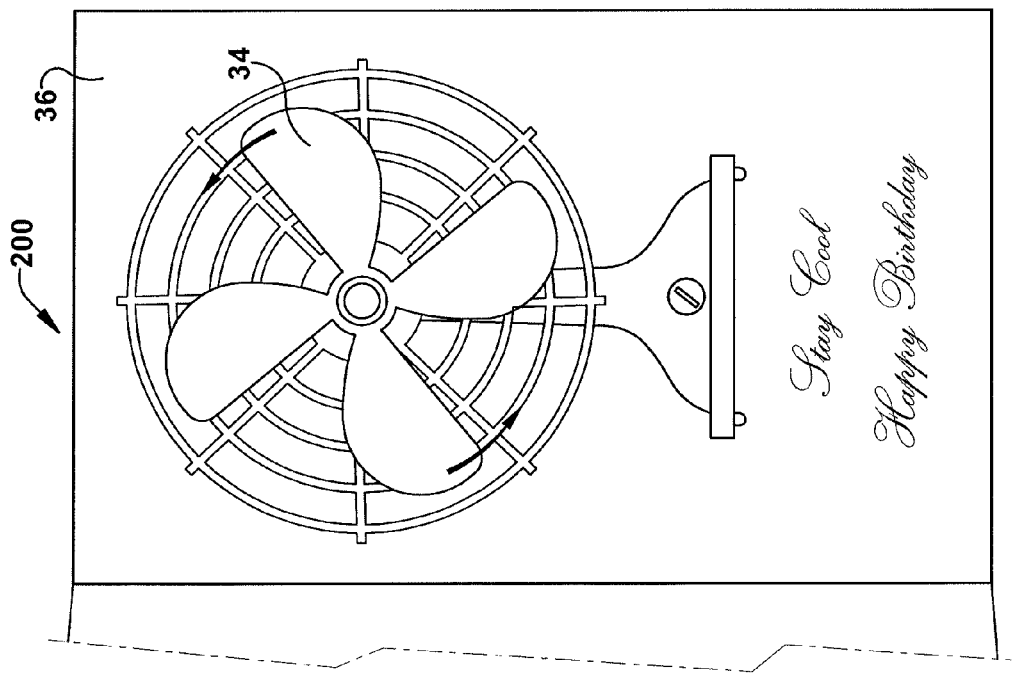
FIG. 3 is a front view of an inside panel of a second embodiment of the motion greeting cards of the present invention.

In a second embodiment, shown in FIGS. 3 and 4, the greeting card 200 contains a motor module 32 which allows one or more mobile objects 34 associated with a greeting card body 36 to spin or rotate. The greeting card body 36 configuration may be the same as described above with regard to the first embodiment, having three greeting card panels attached along a first and second fold line. The electronic components are attached to the second panel and concealed by the overlapping third panel which is attached to the second panel along at least two edges of the second and third panels. The third panel may contain a small hole or aperture to connect the motor 32 to a mobile object 34. The motor 32 may be of the type shown in FIG. 4, having a rotating gear mechanism 37 that when activated turns a circular gear 38. A connecting rod 40 is located between and connects the gear 38 and the mobile object 34 (through the hole or aperture in the third panel of the greeting card). As the gear 38 is rotated by the gear mechanism 37, it in turn causes the moveable object 34 to rotate or "spin". A slide switch 26 may activate a pre-recorded sound clip and the motor 32 upon opening of the greeting card 200. The sound and motor 32 may alternatively be activated by separate switches. The moveable object 34 may be contained on the inside of the greeting card 200 or on the outside front cover of the greeting card 200. The mobile object 34 may be a die cut shape such as a fan, a wheel or any other rotating object.

In a third embodiment, shown in FIGS. 5 and 6, the motion greeting card 300 of the present invention contains at least one motor module 42 that is associated with at least one body of a character 44 which, when activated allows the body 44 to move or to "dance" to the music or sound contained within the audio module. The greeting card body 46 may have three panels, as described above, with the second and third panels overlapping and concealing the greeting card electronics and related circuitry. The third panel may have a small opening or aperture which allows the motor 42 to be connected to the mobile object 44. The front panel may also contain a cut-out portion in the shape of the character head 48 so that it may be seen without opening the greeting card 400. The motor module 42 may be of the type shown in FIG. 6, having a rotating gear mechanism 37 that when activated turns a circular gear 38, which is in turn attached to a connecting rod 40. The mobile object 44 is attached to the other end of the connecting rod 40. The character body 44 contains several separate and distinct pieces or elements representing the arms 52, legs 54 and main body 44 of the character. Each arm 52 and leg 54 is made from two separate die cut pieces. Each of the limbs 52, 54 are connected together and to the character using fiber optic strands so that the body 44 and limbs 52, 54 may move or pivot freely about the attachment point while moving in a reciprocating motion, giving the illusion that the character is dancing. The character head 48 is separated from the body 44 and is connected to a spring mechanism 68 that connects the character head 48 to the front surface of the third greeting card panel 46 and projects the character head 48 out beyond the position of the body 44. The character head 48 projects through the front of the greeting card through the cut-out contained in the first card panel. When the greeting card is opened, the audio and motor modules 42 are activated and the character body 44 and component parts of the character body move in a reciprocating motion and appear to dance to the sound or music played by the audio module.

Figure 7:
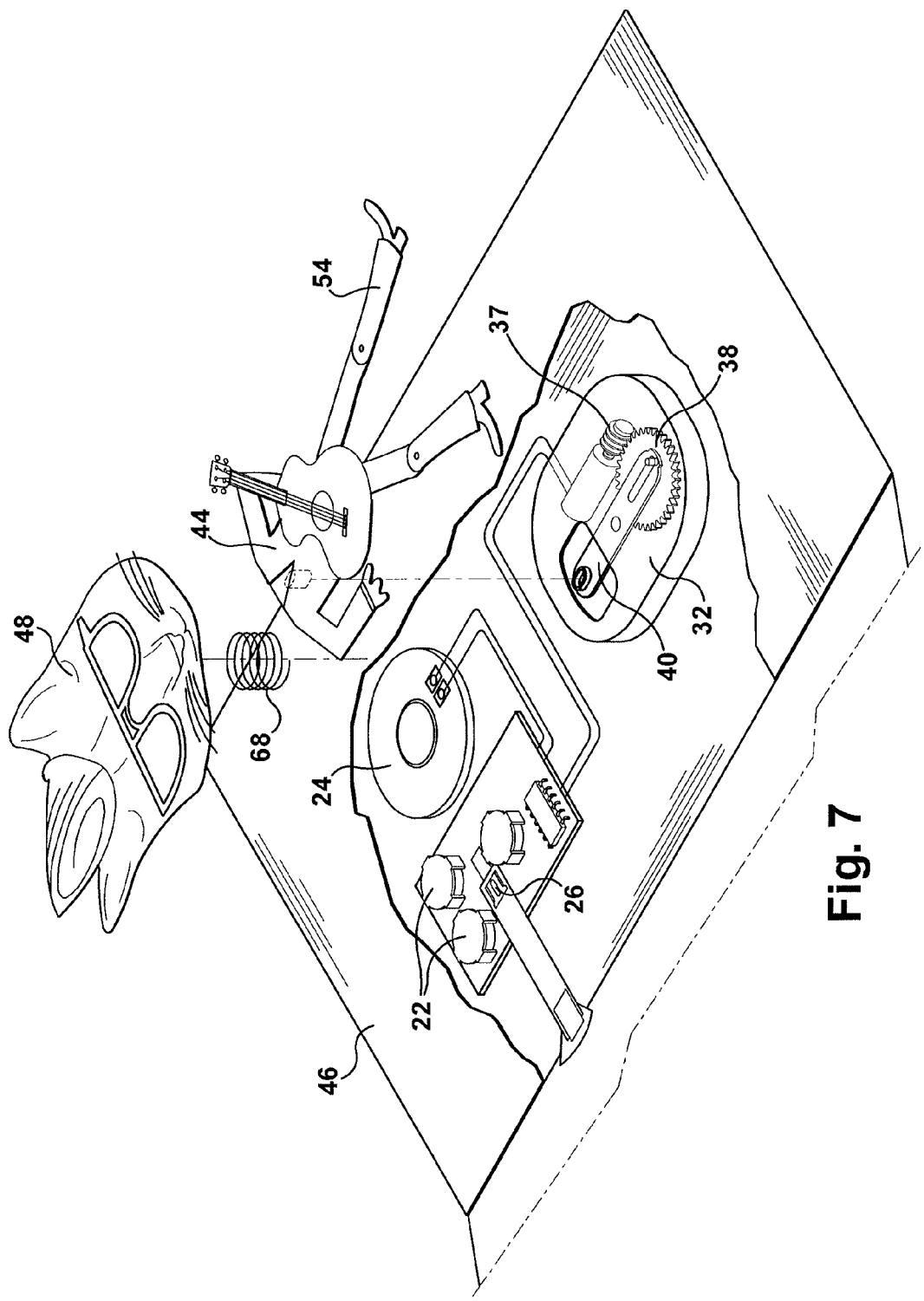
FIG. 7 is an exploded view of the inside panel of the motion greeting card of FIG. 5.
Figure 8:
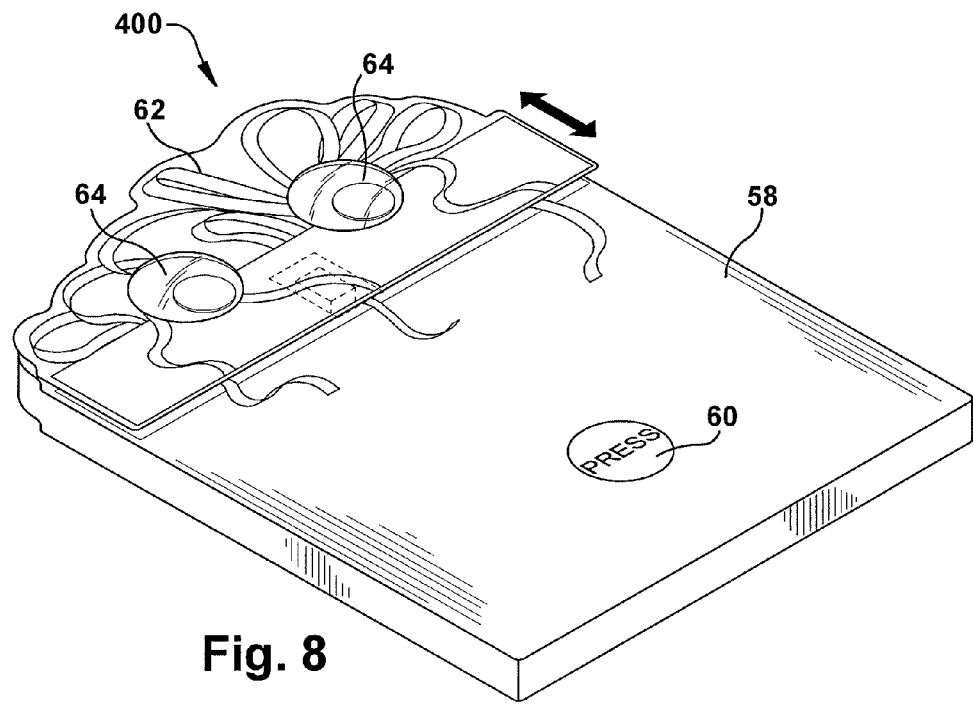
FIG. 8 is a perspective view of a fourth embodiment of the motion greeting cards of the present invention.
Figure 9:
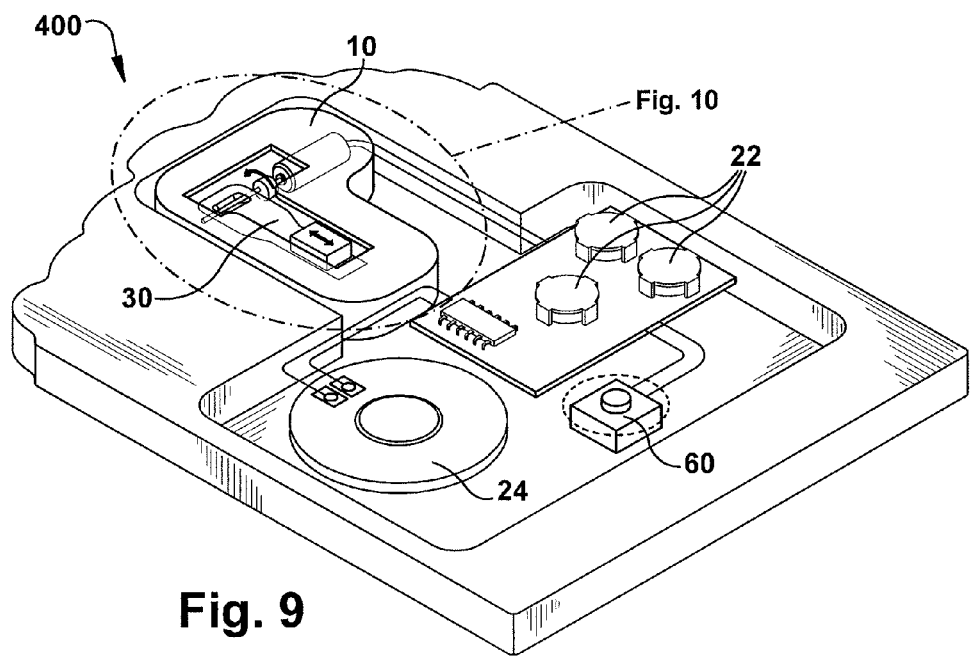
FIG. 9 is an internal view of the motion greeting card of FIG. 8.

In a fourth embodiment, shown in FIGS. 7 and 8, the motion greeting card 400 of the present invention contains a motor module 56 that is associated with a three-dimensional card body 58 having one or more moving parts and designed as a character which, when activated moves in a reciprocating motion, thereby appearing to talk or sing. In this embodiment, the greeting card body 58 is substantially made of foam having a three-dimensional character printed on the front face of the card. When a user presses a push button 60 located on the front face of the greeting card, the audio and motor modules 56 are activated, causing the one or more moving parts to move in a reciprocating motion with respect to the greeting card body 58 thus the making it appear as though the character is talking or singing. A first greeting card panel is attached to the front surface of a foam encasement. The foam encasement houses and conceals the electronic components, including the sound and motor modules 56, of the greeting card 400. A second greeting card panel is connected to a third greeting card panel along a first fold line. The back surface of the second greeting card panel is attached to the back surface of the foam encasement such that the first and second greeting card panels and the foam encasement (which is located between the first and second greeting card panels) serves as the front cover or page of the greeting card and the third greeting card panel serves as the back page or panel of the greeting card. A separate fourth panel is attached via an attachment mechanism 66 to the front panel and serves as the mobile object 62. The panel 62 may be shaped like a mouth or may be shaped to correspond to the artwork printed on the front panel of the card such that when the motor module is activated, thereby moving the fourth panel in a reciprocating motion, it gives the illusion that the character is talking or singing. The fourth panel 62 may contain additional three-dimensional features such as moving eyes 64, etc. The motor 56 may be of the type shown in FIGS. 10 and 11 and described above as having a rotating arm 28 and movement mechanism 30 that is attached to the mobile object 62 or fourth panel 62 via an attachment mechanism 66.

Similarly, another embodiment, shown in FIGS. 12 through 15, may include a three-dimensional card body 72 made of foam or other lightweight foam-like material. The three-dimensional card body 72 may have a front surface, a back surface opposite the front surface, and a perimeter surface therebetween. The front surface of the card body may contain a front cover material 71A and the back surface of the card body may contain a back cover material (not shown). The front 71A and back cover material may be paperboard, cardboard, or other such material. The perimeter surface may remain uncovered and visible between the front and back cover material or may optionally be covered as well. A sound module operative to store and playback at least one audio file is contained within the three-dimensional card body 72. A motor module 75 operative to effect movement of a movable object is also contained within the three dimensional card body 72. A mobile object 73 is connected to the motor 75 through an opening in the three-dimensional card body 72 and the front cover material 71A. In a preferred embodiment, the mobile object 73 is a die cut shape (such as the pretzel shape shown in FIGS. 12 and 13), although other items can be used as a mobile object such as a plastic molded figurine or any other item having a relatively low profile. The mobile object 73 may also contain added embellishments or decorative effects attached thereto. A greeting card sentiment panel 74 may be attached along a fold line to either the front 71A or back cover material, thereby creating a traditional two-panel greeting card. The sentiment panel 74, along with the front 71A and/or back cover material may contain various text greetings or messages and printed artwork, graphics, photographs, or any other printed indicia. The sentiment panel 74 and front 71A and back cover material may also contain three dimensional embellishments attached thereto. In one example, shown in FIGS. 12 and 13, the sentiment panel 74 is attached to the front cover material 71A such that the sentiment panel 74 serves as the front cover of the greeting card and is folded over the three-dimensional card body 72. The mobile object 73 may, as in the embodiment shown in FIGS. 14 and 15, be contained between the sentiment panel 74 and the front cover material 71A (attached to the motor through the front cover material) so that when the user opens the greeting card by moving the sentiment panel 74 away from the three-dimensional card body 72, the mobile object 73 would be visible. In another embodiment (FIGS. 12 and 13), the mobile object may 73 be attached to the motor 75 through an opening in the front cover material 71A but be visible from the front of the greeting card and not located between the sentiment panel 74 and front cover material 71A. In this case, the three-dimensional card body 72 may be larger in size than the sentiment panel 74 such that the sentiment panel 74 only covers part of the three-dimensional card body 72. The sound and motor modules may be activated upon opening the greeting card by moving the sentiment panel 74 away from the three-dimensional card body 72. In a preferred embodiment, a magnetic switch 76 may be located within the sentiment panel 74 and also beneath the front cover material 71A such that when the sentiment panel 74 is in a closed position, the magnets 76A, 76B are in contact, thereby breaking the electrical circuit. When the greeting card is moved to an open position by moving the sentiment panel 74 away from the three-dimensional foam card 72 the magnets 76A, 76B break contact and allow the electrical circuit to be completed, thereby providing power to the sound and/or motor modules. While this embodiment has been described as having a magnetic switch or trigger, other switch mechanisms can be used such as slide switches, light sensitive switches, touch sensitive switches, pull string switches, or any other suitable switch. When a user opens the card 70, the magnetic switch 76 activates the sound and motor modules so that the sound module initiates playback of the at least on audio file and the motor module moves the motor 75 to effect movement of the mobile object 73. As discussed above with respect to the other embodiments, the movement of the mobile object 73 may be in an up-and-down, back-and-forth, circular, vibrational, or any other conceivable motion.

Although the switches described herein with respect to the examples given are described as being slide switches or push-button switches, the use of other types of switches is considered to be within the scope of this invention. Alternate switch mechanisms include, but are not limited to: light activated switches; sound activated switches; touch sensor switches, magnetic switches; and contact arm switches.

All variations of the motion greeting cards, including those described above, may additionally include a microphone and related electronics that would allow a user to record and save one or more personalized messages to be played before, during, after or in place of a pre-recorded sound clip. The personalized message may be played before a pre-recorded audio clip to, for example, introduce the pre-recorded audio clip or may be played after the pre-recorded audio clip to, for example, leave a personalized message to end the audio experience. The personalized message may also be played simultaneously with the pre-recorded audio clip wherein the user may sing-along to a pre-recorded song or instrumental audio clip, karaoke style. The personalized message may be triggered by the same switch mechanism that triggers the pre-recorded audio file or by a separate switch which may be a slide switch, a push button, a light-activated switch, motion sensor switch, or any other type of switch. The sound module may also include voice changing capabilities wherein a user may record a personalized message and then choose to alter the recorded voice message by increasing or decreasing the pitch or by speeding up or slowing down the cadence of the message. The sound module may also have the ability to store more than one personalized messages which can be played, in any combination before, during, after or in place of a pre-recorded audio clip. The additional messages may be triggered by the same trigger or by multiple trigger mechanisms.

Other variations of the motion greeting cards may include the addition of lights and additional pre-recorded digital audio files or additional mobile objects.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Other features and aspects of this invention will be appreciated by those skilled in the art upon reading and comprehending this disclosure. Such features, aspects, and expected variations and modifications of the examples are clearly within the scope of the invention where the invention is limited solely by the scope of the following claims.

What is claimed is:

1. A motion greeting card comprising:
   a foam body having one or more openings therein;
   a front sheet material which is attached to a front surface of the foam body;
   a rear sheet material which is attached to a rear surface of the foam body;
   a sound module contained within the one or more openings on the foam body, the sound module operative to store and playback at least one audio file;
   a motor module contained within the one or more openings on the foam body, the motor module operative to effect movement of a mobile object;
   a single sentiment panel which is attached to the front sheet material and which serves as a front cover of the greeting card;
   the mobile object being attached to the motor module through an opening in the front sheet material and being located above the single sentiment panel such that the mobile object is completely visible when the single sentiment panel is in both a closed and an open position;
   one or more switches which control activation of the sound and motor modules.

2. The motion greeting card of claim 1, wherein the mobile object is a die cut shape.

3. The motion greeting card of claim 1, wherein the front sheet material is shaped identically to the foam body.

4. The motion greeting card of claim 1, wherein the rear sheet material is shaped identically to the foam body.

5. The motion greeting card of claim 1, wherein the foam body has a length which is greater than a length of the single sentiment panel.

6. The motion greeting card of claim 1, wherein the single sentiment panel does not cover the entire front surface of the greeting card.

7. The motion greeting card of claim 1, wherein the mobile object is not covered by the single sentiment panel.

8. The motion greeting card of claim 1, wherein the switch is a magnetic switch.

9. A motion greeting card comprising:
   a foam greeting card body having a front surface, a rear surface and a perimeter surface therebetween;
   a rear sheet material attached to the rear surface of the foam greeting card body;
   a front sheet material attached to a perimeter portion of the front surface of the foam greeting card body;
   a sound module contained within the foam greeting card body;
   a motor module contained within the foam greeting card body;
   a mobile object connected to the motor module, the mobile object located in a recessed portion of the front surface of the foam greeting card body in an area surrounded by the front sheet material;
   a single sentiment panel attached to the front sheet material;
   wherein moving the single sentiment panel away from the foam greeting card body causes the sound module to initiate playback of an audio file and also causes the motor module to cause movement of the mobile object.

10. The motion greeting card of claim 9 further comprising a magnetic switch.

11. The motion greeting card of claim 9, wherein the single sentiment panel is shaped identical to the foam greeting card body.

12. The motion greeting card of claim 9, wherein the mobile object is a die cut shape.

13. The motion greeting card of claim 9, wherein the mobile object is located between the single sentiment panel and the foam greeting card body.

14. The motion greeting card of claim 9, wherein the mobile object is not visible from the front of the greeting card.

15. The motion greeting card of claim 11, wherein the single sentiment panel sits flush with the front sheet material when the single panel is in the closed position.

16. The motion greeting card of claim 9, wherein closing the single sentiment panel by moving it toward the foam greeting card body, deactivates the sound and motor modules.

17. The motion greeting card of claim 9 further comprising a magnetic switch.

18. The motion greeting card of claim 9, wherein the single sentiment panel is attached to the foam greeting card body via a magnet.

19. The motion greeting card of claim 9, wherein the recessed portion of the front surface of the foam greeting card body is not covered by the front sheet material.

20. The motion greeting card of claim 9, wherein the foam greeting card body is shaped like a heart.

\* \* \* \* \*